(12) United States Patent
Starns

(10) Patent No.: US 8,671,792 B1
(45) Date of Patent: Mar. 18, 2014

(54) MULTIMODE ACTUATOR FOR DOCUMENT SCANNING APPARATUS

(75) Inventor: Alexander T. Starns, Redwood City, CA (US)

(73) Assignee: Google Inc., Mountain View, CA (US)

( * ) Notice: Subject to any disclaimer, the term of this patent is extended or adjusted under 35 U.S.C. 154(b) by 388 days.

(21) Appl. No.: 13/038,146

(22) Filed: Mar. 1, 2011

(51) Int. Cl.
*F16H 57/12* (2006.01)

(52) U.S. Cl.
USPC .............................. 74/395; 74/397

(58) Field of Classification Search
USPC ................ 74/405, 395, 396, 397, 412 R, 413
See application file for complete search history.

(56) References Cited

U.S. PATENT DOCUMENTS

| | | | | |
|---|---|---|---|---|
| 4,060,446 A | * | 11/1977 | Carter | 156/475 |
| 4,887,478 A | * | 12/1989 | Neuman | 74/354 |
| 4,942,777 A | * | 7/1990 | Fife | 74/397 |
| 5,159,848 A | * | 11/1992 | Lawrence | 74/421 A |
| 5,685,197 A | * | 11/1997 | Baker et al. | 74/409 |
| 5,740,696 A | * | 4/1998 | Jean et al. | 74/354 |
| 6,810,760 B2 | * | 11/2004 | Sye et al. | 74/405 |

* cited by examiner

*Primary Examiner* — David M Fenstermacher
(74) *Attorney, Agent, or Firm* — Fenwick & West LLP

(57) ABSTRACT

A multimode actuator for a document scanning apparatus is used to manipulate a book cradle along two degrees of freedom. The apparatus includes a drive shaft that is moveable along an axis to actuate the drive shaft in a first position and a second position. In the first position, the drive shaft engages with a spacing gear and disengages with a translation gear, wherein a rotation of the drive shaft while in the first position causes spacing between cradle halves to change. In the second position, the drive shaft engages the translation gear and disengages the spacing gear, wherein a rotation of the drive shaft while in the second position causes the lateral position of the document cradle to change while maintaining the spacing between the cradle halves.

18 Claims, 4 Drawing Sheets

MULTIMODE ACTUATOR FOR DOCUMENT SCANNING APPARATUS

FIELD OF THE INVENTION

The present invention relates in general to a document scanning apparatus and in particular to an apparatus having a cradle that can be manipulated in multiple degrees of freedom.

BACKGROUND

Scanning books, magazines, and other printed material into digital form has become common with the advent of improved imaging, storage and distribution techniques. Although many types of unbound printed material can generally be scanned with relative ease using automatic page-feeding mechanisms such as those commonly found on digital copiers and scanners, some types of unbound documents and most types of bound documents present additional challenges.

Various mechanisms have been developed to enable the scanning of bound documents. For example, a traditional flat-bed platen scanner scans bound documents in a face-down position. However, for best results, a flat-bed scanner typically requires the application of force to the spine or binding of the bound documents to insure that the pages come within the scanner's depth of field. Such force can damage the document. In addition, using the flat-bed platen can be tedious and time-consuming, as the bound documents typically must be lifted and repositioned after each page is scanned. Further, image quality is often poor due to loss of focus, uneven illumination, and distortion caused by page curvature in the vicinity of the binding.

An alternative to the traditional flat-bed platen scanner is a platen-less scanner that captures image data from a bound document in a face-up position. Such scanners typically provide a cradle assembly supporting the document during scanning. An operator can place a document on the cradle assembly and manipulate the cradle to ensure that the pages are in an image capture device's field of view. However, such manipulations typically require two-handed manipulation. These actions are tedious and time consuming, and can lead to errors or poor image quality of the resultant scans.

SUMMARY

Accordingly, embodiments of the claimed invention address the above-mentioned problems, by providing a cradle actuator for a document scanning apparatus that has a document cradle with first and second halves. The cradle actuator includes a drive shaft that is rotatable along an axis and moveable along the axis to place the drive shaft in a first position and a second position. The cradle actuator also includes a first gear disposed on the drive shaft at a location such that the first gear engages with a spacing gear in the first position and disengages with the spacing gear in the second position. The spacing gear changes the spacing between the first and second halves of the document cradle responsive to the rotation of the drive shaft while in the first position. The cradle actuator also includes a second gear disposed on the drive shaft at a location wherein the second gear engages with a translation gear in the second position and disengages with the translation gear in the first position. The translation gear changes a lateral position of the document cradle responsive to a rotation of the drive shaft while in the second position.

One embodiment of the invention is a method of manipulating a cradle actuator for a document scanning apparatus having a document cradle with first and second halves. The method includes moving a drive shaft along an axis to place the drive shaft in a first position causing a first gear disposed on the drive shaft to engage with a spacing gear and causing a second gear disposed on the drive shaft to disengage with a translation gear. Rotating the drive shaft about the axis in the first position causes the spacing gear to change spacing between the first and second halves of the document cradle. Similarly, moving the drive shaft along the axis to place the drive shaft in a second position causes the second gear disposed on the drive shaft to engage with the translation gear and causes the first gear to disengage with the spacing gear. Rotating the drive shaft about the axis in the second position causes the translation gear to change lateral position of the document cradle.

Another embodiment of the invention is a cradle actuator for a document scanning apparatus having a document cradle with first and second halves. The cradle actuator includes a means for engaging with a spacing gear in a first position and disengaging with the spacing gear in a second position responsive to a movement of the drive shaft along an axis. The cradle actuator also includes a means for changing spacing between the first and second halves of the document cradle responsive to rotation of the drive shaft while in the first position. Additionally, the cradle actuator includes a means for engaging with a translation gear in the second position and disengaging with the translation gear in the first position responsive to movement of the drive shaft along the axis and a means for changing the lateral position of the document cradle responsive to rotation of the drive shaft about the axis while the drive shaft is in the second position.

DETAILED DESCRIPTION OF THE EMBODIMENTS

The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purposes of clarity, details relating to technical material that is known in the technical fields related to the invention have not been described in detail so as not to unnecessarily obscure the present invention.

Figure 1:
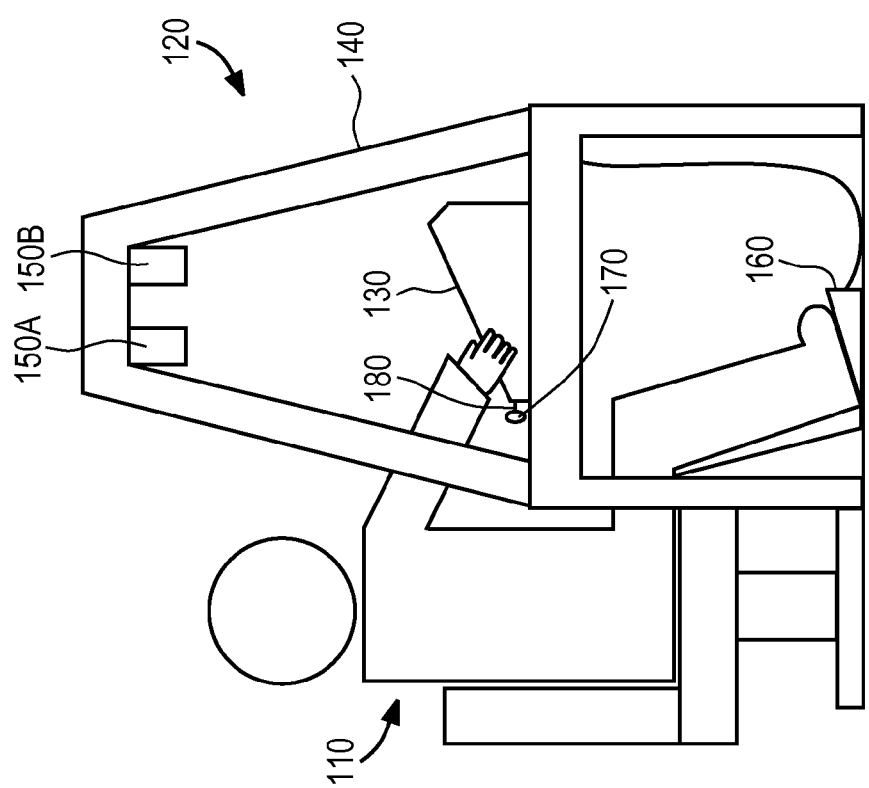
FIG. 1 is a schematic diagram illustrating an operator using a document scanning apparatus according to one embodiment.

FIG. 1 is a schematic diagram illustrating an operator 110 using a document scanning apparatus 120 according to one embodiment. The scanning apparatus 120 includes a cradle 130 on which a document being scanned is placed and a housing 140 upon which one or more digital image capture devices 150A, 150B (referred to as "cameras" herein), lighting mechanisms and/or other components are attached. In the illustrated embodiment, the operator 110 places a book or other document being scanned on the cradle 130 and triggers the cameras 150 by depressing a foot pedal 160. The captured digital images are then stored by a non-transitory storage device and used for purposes such as building a library of digital documents.

In order to obtain high-quality images, the pages of the document being scanned must align with the cameras 150. Therefore, the scanning apparatus allows the operator 110 to manipulate the cradle 130 in order to move the cradle, and document, relative to the cameras 150. The operator 110 can use a handle 170 coupled to a drive shaft 180 to control a cradle actuator (not shown in FIG. 1) that moves the cradle. In one embodiment, the operator 110 can move the cradle 130 in two degrees of freedom using the single handle 170. This design allows the operator 110 to manipulate the location of the cradle 130 using only a single hand, freeing the other hand for other tasks such as turning pages of the document. Therefore, the document scanning apparatus 120 provides greater scanning efficiency relative to other devices that require more effort by the operator 110 to align the document and cameras 150.

Figure 2:
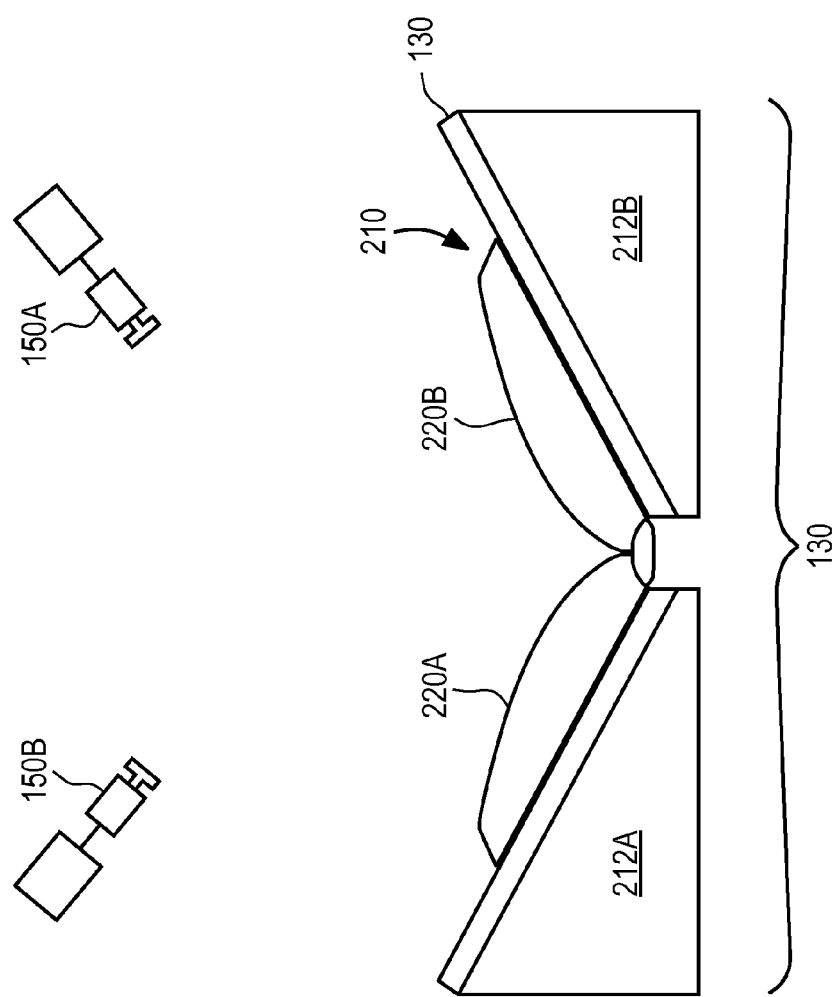
FIG. 2 is a schematic diagram illustrating a side view of the document scanning apparatus according to one embodiment.

FIG. 2 is a schematic diagram illustrating a side view of the document scanning apparatus 120 according to one embodiment. Some elements of the apparatus are omitted for clarity. FIG. 2 illustrates the cradle 130 having a document (a book) 210 cradled on it in an open position that exposes two facing pages 220A, 220B. The cradle includes a left half 212A and a right half 212B, each of which supports a corresponding portion of the document. FIG. 2 also illustrates two cameras 150A, 150B, each of which captures an image of the corresponding facing page 220A, 220B of the document 210.

As mentioned above, the cradle 130 can move in two degrees of freedom in order to align the pages 220 with the cameras 150. One degree of motion is a horizontal translation of the entire cradle 130 (and document residing thereon) relative to the cameras 150. Thus, in FIG. 2, the cradle 130 can be horizontally translated left or right while the cameras remain fixed.

The second degree of motion is the spacing between the cradle halves 212. Specifically, the left 212A and right 212B cradle halves can move closer together or further apart from each other. This degree of motion allows the operator 110 to adjust the cradle 130 to fit the document 210. Different documents have different-sized bindings and oftentimes a cradle 130 sized for a first document's binding will not adequately support a second document having a different binding. Therefore, spacing between the cradle halves 212 can be adjusted to fit the binding and ensure that the document 210 pages 220 are optimally aligned with the cameras 150.

Figure 3:
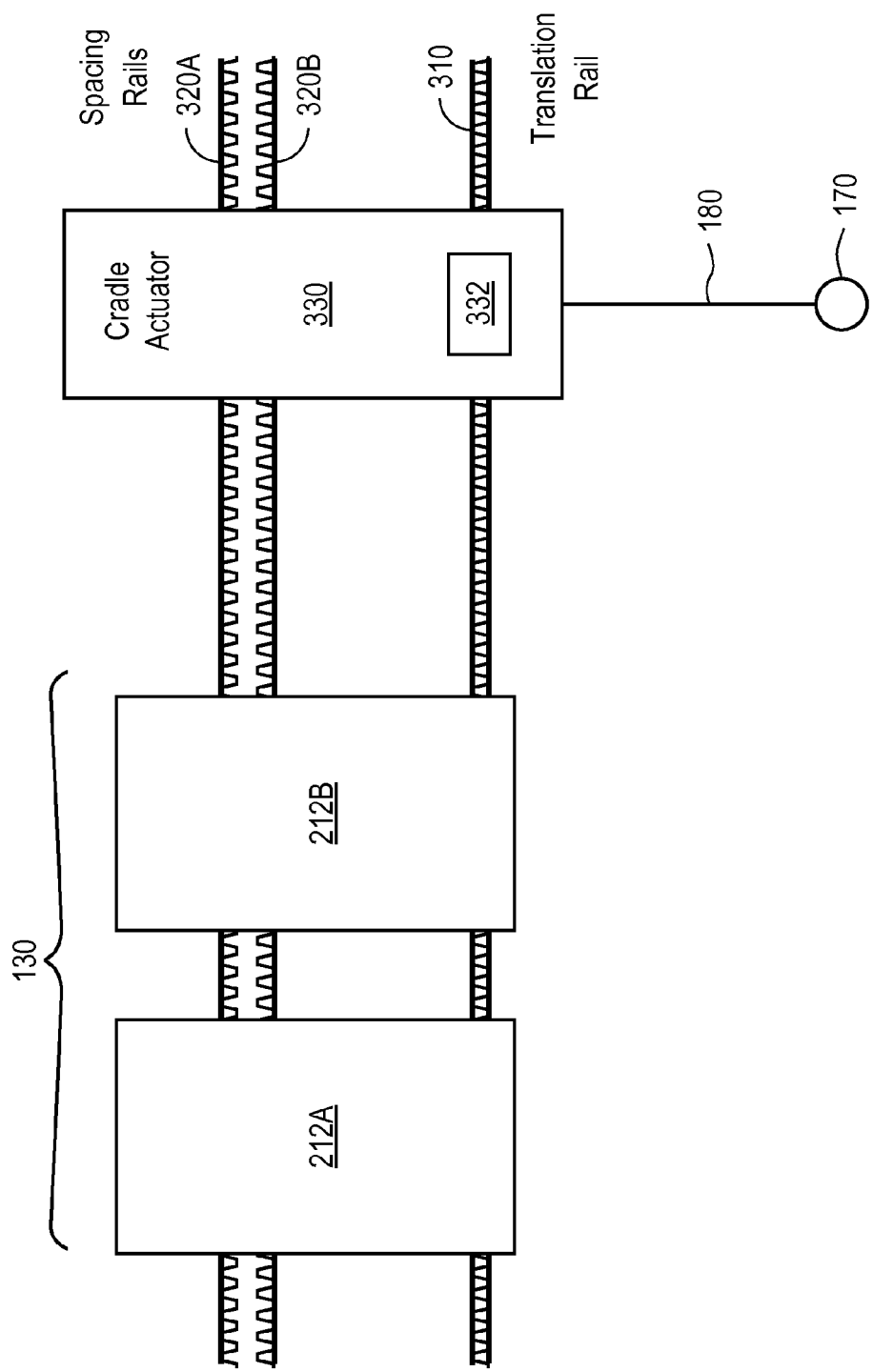
FIG. 3 is a schematic diagram illustrating a simplified top down view of the document scanning apparatus according to one embodiment.

FIG. 3 is a schematic diagram illustrating a simplified top down view of the document scanning apparatus 120 according to one embodiment. FIG. 3 illustrates the left 212A and right 212B cradle halves aligned over a translation rail 310 and two spacing rails 320A, 320B. A cradle actuator 330 is aligned over the rails 310, 320 and coupled to the handle 170 via the drive shaft 180.

To move the cradle 130, the operator 110 manipulates the handle 170 to put it in either translation mode (i.e., the first degree of freedom) or spacing mode (i.e., the second degree of freedom). Once the handle 170 is in a given mode, the operator 170 rotates the handle either clockwise or counter-clockwise to turn the drive shaft 180. The drive shaft 180 imparts the rotation to the cradle actuator 330 which, in turn, moves the cradle 130 according to the selected mode.

In one embodiment, the cradle actuator 330 is affixed to the translation rail 310. The cradle 130 is affixed to the spacing rails 320, which, in turn, are affixed to the cradle actuator 330. When the operator 110 rotates the drive shaft 180 while in translation mode, the cradle actuator 330 laterally moves along the translation rail 310. The lateral movement of the cradle actuator 330 also laterally moves the cradle 130 and the spacing rails, while maintaining the set spacing between the cradle halves 212. In one embodiment, the cradle actuator 330, spacing rails 320, and cradle 130 are mounted on a cradle platform (not shown). When the drive shaft 180 is rotated while in translation mode, the cradle platform laterally moves along the translation rail, thereby imparting lateral movement to the objects mounted on it.

The left 212A and right 212B halves of the cradle 130, in contrast, are affixed to the spacing rails 320 so that the spacing between the cradle halves can be controlled independent of any translation of the cradle. When the operator 110 rotates the drive shaft 180 while in spacing mode, the two spacing rails 320 move laterally in opposite directions, thereby driving the cradle halves 212 together or apart. Hence, the operator 110 can use the translation mode to align the document 210 being scanned with the cameras 150 and use the spacing mode to fit the cradle 130 to the document and improve the quality of the scan.

A cradle position sensor 332 is mounted within the cradle actuator 330. The position sensor 332 senses the translated position of the cradle actuator 330 and, therefore, the cradle 130. In one embodiment, the position sensor 332 includes an infrared linear optical encoder that senses position marks (e.g., holes) in the cradle platform. The output of the position sensor 332 can be provided to a microprocessor associated with the document scanning apparatus 120 and used to improve the quality of the document scan.

Figure 4:
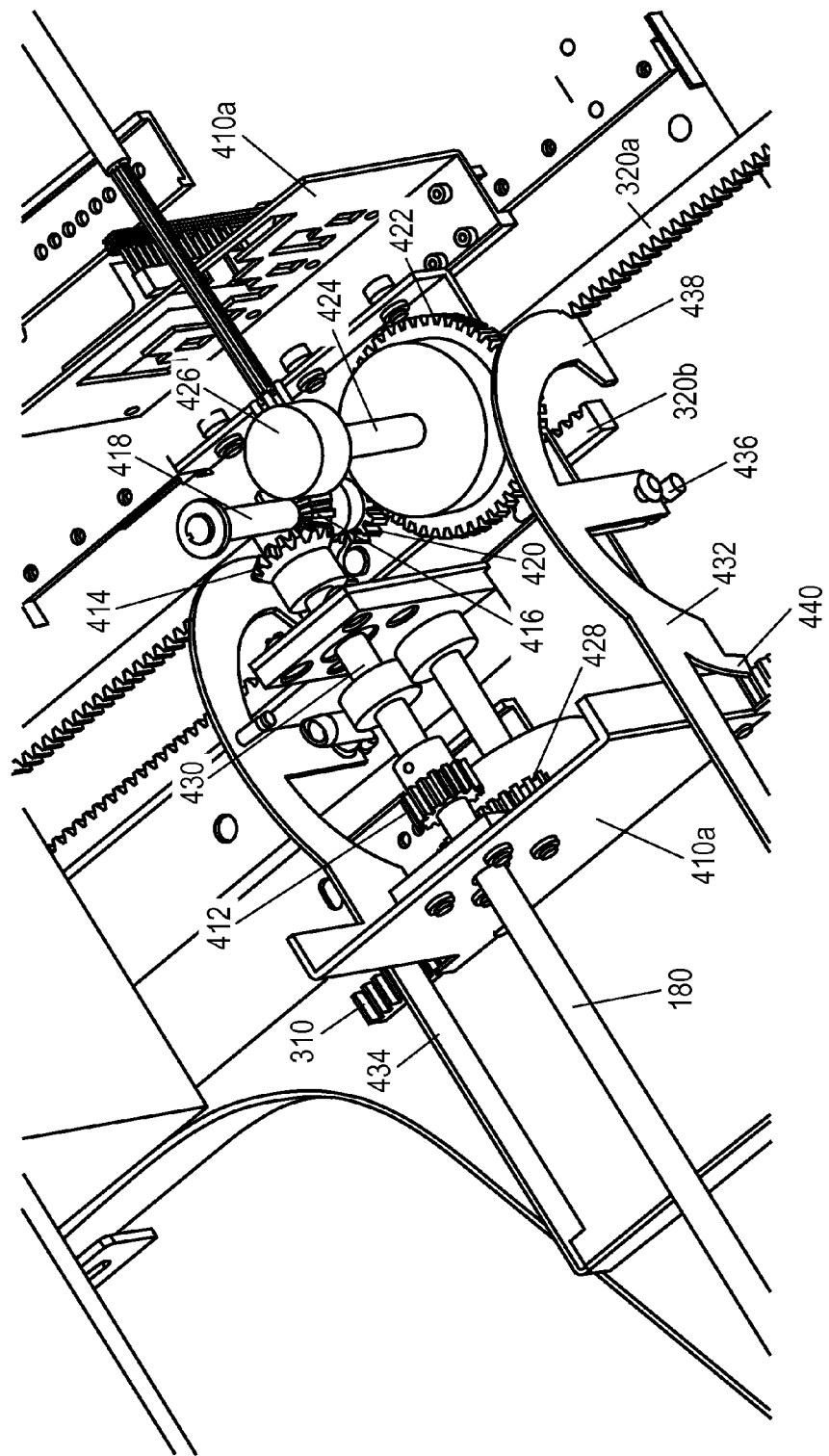
FIG. 4 illustrates a perspective view of the internal structure of the cradle actuator according to one embodiment.

FIG. 4 illustrates a perspective view of the internal structure of the cradle actuator 330 according to one embodiment. In one embodiment, the cradle actuator 330 is enclosed by walls. Only the forward 410A and rear 410B enclosure walls are illustrated in FIG. 4, so that the internal structure is visible.

As shown, the drive shaft 180 passes through an opening in the forward enclosure wall 410A and extends toward the back enclosure wall 410B. The drive shaft 180 can slideably move in the direction of its long axis toward either the front or rear enclosure walls 410A, 410B. Mounted on the drive shaft 180 are a spur gear 412 and a miter gear 414. These gears 412, 414 are disposed at positions on the drive shaft 180 that allow only one of the gears to mesh with a corresponding gear in the cradle actuator 330 at a time, depending on whether the drive shaft is slid forward (away from the operator 110) or backward (toward the operator). The position of the drive shaft 180, and the corresponding meshed gear, control whether the actuator is in translation or spacing mode.

FIG. 4 illustrates the cradle actuator 330 with the drive shaft 180 positioned in spacing mode. The drive shaft 180 is in the forward position and the miter gear 414 engages with a corresponding spacing miter gear 416 to form a transmission. The transmission drives an idler shaft 418 having a spacing mode spur gear 420 attached thereon, such that idler shaft 418 transmits the rotation caused by the transmission of miter gears 414, 416 to the spacing mode spur gear 420. The spacing mode spur gear 420 meshes with a second spacing mode spur gear 422 attached to a vertical sensor shaft 424. A spacing sensor 426 is attached to one end of the sensor shaft 424 and measures the rotation of the shaft 424. The measured rotation can be used by the microprocessor associated with the document scanning apparatus 120 to detect the spacing between the cradle halves 212. In one embodiment, the spacing sensor 426 is a potentiometer.

In addition, the idler shaft 418 extends below the spacing mode spur gear 420 and extends through an opening in the floor enclosure wall. Underneath the floor enclosure wall, a third spacing mode spur gear (not illustrated) is attached to the idler shaft 418, such that the third spacing mode spur gear rotates as the idler shaft 418 rotates. The third spacing mode spur gear meshes with the spacing rails 320, with the cradle rails 320 on either side of the third spur gear in a rack and pinion configuration. Thus, as the third spacing mode spur gear rotates, it causes the spacing rails 320 to move in opposite directions and controls the spacing between the cradle halves 212.

If the drive shaft 180 is placed in the translation mode position, the miter gear 414 disengages with the cradle spacing miter gear 416 and the spur gear 412 engages with a translation mode spur gear 428. The translation mode spur gear 428 meshes with the translation rail 310 in a rack and pinion configuration. If the drive shaft 180 is rotated, the spur gear's 412 rotation is imparted to the translation mode spur gear 428 which, in turn, results in lateral movement of the translation mode spur gear 428, and cradle actuator, in a corresponding direction along the translation rail 310. In one embodiment, the floor enclosure wall includes an opening through which a portion of the translation mode spur gear 428 protrudes to mesh with the translation rail 310.

In one embodiment, a spring assembly 430 biases the drive shaft 180 toward the front enclosure wall 410A. The spring assembly 430 thus meshes the spur gear 412 and the translation mode spur gear 428 and biases the cradle actuator 330 into translation mode. The operator 110 applies force to the drive shaft 180 to slide it toward the back enclosure wall 302 and compress the spring to place the cradle actuator 330 in spacing mode. In other embodiments, the spring assembly 430 biases the drive shaft in the opposite direction, or in a neutral direction.

Further, in one embodiment the cradle actuator 330 includes a bimodal locking mechanism 432 for locking the actuator in either translation or spacing mode. The locking mechanism 432 includes a handle 434 that extends outward toward the operator 110. The operator 110 can use the handle 434 to rotate the locking assembly 432 about a pivot point 436 to lock the cradle actuator 330 in a selected mode. When the handle 434 is in the up position, spacing teeth on the locking mechanism 438 engage with the spacing rails 320 and prevent the rails' movement. Similarly, when the handle 434 is in the down position, translation teeth 440 on the locking mechanism 432 engage with the translation rail 310 and prevent the cradle actuator 330 from moving laterally. The locking mechanism 432 thus assists the operator 110 in operating the document scanning apparatus 120 by preventing inadvertent movement.

In sum, the operator 110 can manipulate the cradle 130 of the document scanning apparatus 120 in two degrees of freedom using a single hand. By turning the drive shaft 180 by means of the handle 170, the operator 110 can move the cradle 130 left and right while maintaining set spacing between the two cradle halves 212. By pushing and turning the handle 170 the operator 110 can open and close the two halves 212 of the cradle 130 while maintaining the left/right position. The cradle actuator 330 also includes a locking mechanism 432 that can be used to lock either degree of freedom.

The invention claimed is:

1. A cradle actuator for a document scanning apparatus having a document cradle with first and second halves, comprising:
   a drive shaft moveable along an axis to place the drive shaft in a first position and a second position and rotatable about the axis;
   a first gear disposed on the drive shaft at a location wherein the first gear engages with a spacing gear in the first position and disengages with the spacing gear in the second position, the spacing gear adapted to change spacing between the first and second halves of the document cradle responsive to rotation of the drive shaft while in the first position; and
   a second gear disposed on the drive shaft at a location wherein the second gear engages with a translation gear in the second position and disengages with the translation gear in the first position, wherein the translation gear is meshed with a translation rail and laterally moves the document cradle responsive to rotation of the drive shaft, the translation gear adapted to change a lateral position of the document cradle responsive to rotation of the drive shaft while in the second position.

2. The cradle actuator of claim 1, wherein the first gear and spacing gear are miter gears and engage to form a transmission responsive to the drive shaft being in the first position.

3. The cradle actuator of claim 1, wherein the spacing gear is disposed to drive spacing rails responsive to rotation of the drive shaft, the spacing rails controlling spacing between the first and second halves of the document cradle.

4. The cradle actuator of claim 1, further comprising:
   a spring assembly adapted to bias the drive shaft into the first position or the second position.

5. The cradle actuator of claim 1, further comprising:
   a movable locking mechanism adapted to be in one of a first locking position and a second locking position, the first locking position preventing changing of the spacing between the first and second cradle halves and the second locking position preventing changing of the lateral position of the document cradle.

6. The cradle actuator of claim 1, further comprising:
   a spacing sensor adapted to detect spacing between the first and second cradle halves responsive to rotation of the drive shaft while in the first position.

7. The cradle actuator of claim 1, further comprising:
   a cradle position sensor adapted to sense the lateral position of the document cradle responsive to rotation of the drive shaft while in the second position.

8. A method of manipulating a cradle actuator for a document scanning apparatus having a document cradle with first and second halves, comprising:
   moving a drive shaft along an axis to place the drive shaft in a first position and cause a first gear disposed on the drive shaft to engage with a spacing gear and cause a second gear disposed on the drive shaft to disengage with a translation gear, wherein the translation gear is meshed with a translation rail and laterally moves the document cradle responsive to rotation of the drive shaft;
   rotating the drive shaft about the axis while in the first position and cause the spacing gear to change spacing between the first and second halves of the document cradle;
   moving the drive shaft along the axis to place the drive shaft in a second position and cause the second gear disposed on the drive shaft to engage with the translation gear and cause the first gear to disengage with the spacing gear; and rotating the drive shaft about the axis while in the second position and cause the translation gear to change lateral position of the document cradle.

9. The method of claim 8, wherein the first gear and spacing gear are miter gears and engage to form a transmission responsive to the drive shaft being in the first position.

10. The method of claim 8, wherein the rotation of the drive shaft in the first position drives spacing rails that control spacing between the first and second halves of the document cradle.

11. The method of claim 8, wherein a spring assembly disposed on the drive shaft biases the drive shaft into the first position or the second position.

12. The method of claim 8, further comprising:
moving a locking mechanism to a first locking position or a second locking position, the first locking position preventing changing of the spacing between the first and second cradle halves and the second locking position preventing changing of the lateral position of the document cradle.

13. The method of claim 8, further comprising:
detecting, by a spacing sensor, spacing between the first and second cradle halves responsive to the rotation of the drive shaft while in the first position.

14. The method of claim 8, further comprising:
detecting, by a position sensor, lateral position of the document cradle responsive to rotation of the drive shaft while in second position.

15. A cradle actuator for a document scanning apparatus having a document cradle with first and second halves, comprising:

means for engaging with a spacing gear in a first position and disengaging with the spacing gear in a second position responsive to movement of a drive shaft along an axis;
means for changing spacing between the first and second halves of the document cradle responsive to rotation of the drive shaft about the axis while in the first position;
means for engaging with a translation gear in the second position and disengaging with the translation gear in the first position responsive to movement of the drive shaft along the axis, wherein the translation gear is meshed with a translation rail and laterally moves the document cradle responsive to rotation of the drive shaft; and
means for changing a lateral position of the document cradle responsive to rotation of the drive shaft about the axis while in the second position.

16. The cradle actuator of claim 15, further comprising:
means for biasing the drive shaft in the first position or the second position.

17. The cradle actuator of claim 15, further comprising:
means for preventing changing of the spacing between the first and second cradle halves and changing of the lateral position of the document cradle.

18. The cradle actuator of claim 15, further comprising:
means for detecting spacing between the first and second cradle halves responsive to rotation of the drive shaft while in the first position; and
means for sensing the lateral position of the document cradle responsive to rotation of the drive shaft while in the second position.

* * * * *